Figure 1:
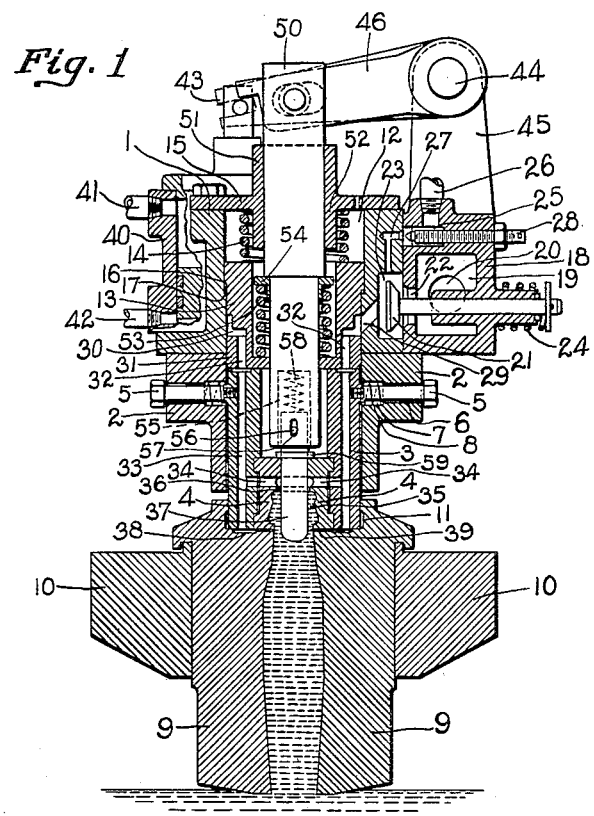

March 21, 1933.                A. J. SMITH                1,901,934
METHOD OF FORMING PARISONS Filed Nov. 9, 1929

Witness:
Jas. G. White

Inventor
Algy J. Smith
by Brown & Parker
Attorneys

Patented Mar. 21, 1933

1,901,934

UNITED STATES PATENT OFFICE

ALGY J. SMITH, OF BLOOMFIELD, CONNECTICUT, ASSIGNOR TO HARTFORD-EMPIRE COMPANY, OF HARTFORD, CONNECTICUT, A CORPORATION OF DELAWARE

METHOD OF FORMING PARISONS

Application filed November 9, 1929. Serial No. 406,004.

This invention relates to methods of, and apparatus for, forming glass parisons, and more particularly to the shaping of a charge of molten glass that is drawn by suction into a parison mold, or other gathering receptacle.

One mode of procedure which is followed in forming glass parisons consists in dipping a parison mold into a pool of glass, gathering a charge of glass in the parison mold and an associated neck mold by suction, and severing the string or tail of glass from the charge by means of a shear blade as the charged mold is moved away from the gathering pool.

The shear blade may be carried by the support for the parison mold, and held in engagement with the bottom of the mold to support the charge while the charge is subjected to preliminary blowing pressure; or it may be replaced by a bottom plate serving the same purpose; or a shear blade may be employed which is stationarily mounted on the extension of the glass melting tank and across which the parison mold is moved to effect the severing action. When such a shear blade is used, a bottom plate usually is moved into engagement with the bottom of the parison mold at the instant that the mold is removed from engagement with the shear blade, for supporting the charge for preliminary blowing.

In any event, the methods heretofore employed in forming parisons have not been satisfactory because shear marks produced by the severing operation are not removed and hence cause defects in the finished ware. Such shear marks generally are not minimized or eliminated in the prior methods because the chilled sheared end of the charge is not permitted to reheat and to be reconditioned, this being prevented by the contact of the shear or bottom plate with the bottom of the charge and the contact of the bottom edge of the charge with the mold, immediately after the severing operation.

It is an object of this invention to provide a novel method of and novel apparatus for gathering charges of glass by suction, and shaping the charges by the employment of which a gathered charge is separated from the supply pool, and is subsequently fabricated in such a manner as to obliterate or minimize any scar or shear mark which may be formed thereon. This may be accomplished by holding the bottom and bottom edge of the charge out of contact with the charge forming mechanisms immediately after the severing operation for a sufficiently long period to permit the bottom of the charge to reheat and to be reconditioned.

A further object of this invention is to provide an improved method of and apparatus for gathering charges of glass in a suction gathering receptacle whereby not only is the shear mark or scar minimized or removed from the charge, during the fabrication thereof into a parison, but the usual initial blowing cavity is enlarged to facilitate the final blowing of the parison into an object of glassware, and to force the glass of the parison into intimate contact with the walls of the parison mold cavity to effect uniform and relatively rapid chilling and setting of the glass, and a uniform distribution of the glass in the parison.

Other objects and advantages of the invention will be pointed out in the detailed description thereof which follows, or will become apparent from such description.

In accordance with this invention, a parison mold and associated neck mold may be filled with glass from a supply pool by suction. Preferably, the filling of the parison mold and neck mold is accomplished very quickly by holding the plunger or neck pin in an elevated position which permits unrestricted application of vacuum to the parison mold until said mold is nearly filled, whereupon the plunger or neck pin is lowered into position to form the initial blowing cavity and to assist in the shaping and setting of the neck finish. As soon as the parison mold and neck mold are filled with glass, the mold unit is raised out of contact with the glass in the gathering pool and the string or tail of glass is severed from the charge in suitable manner.

Immediately after the glass severing operation, the severed end of the charge is drawn inwardly of the parison mold and is contracted preferably by forming a substantially semi-spherical recess in the bottom of the charge. In the apparatus illustrated herein, the step of forming the recess is accomplished by maintaining the vacuum in the mold after the severing operation, and elevating the neck pin or plunger sufficiently to cause the glass to be pushed up to the desired extent by atmospheric pressure acting on the bottom of the charge. This formation of a recess in the bottom of the charge is accompanied by the contraction of the bottom edge portion thereof, so that the bottom part of the charge is drawn out of contact with the mold wall and also upwardly from the plane of the bottom of the mold. This permits the bottom and bottom edge portions of the charge to be reheated out of contact with metal ports of the mechanism, and the chilled or scarred portion thereof is reconditioned by the relatively hot body of the charge.

Subsequently, the vacuum is cut off, and preliminary blowing air is admitted through the suction and blow head into the initial blowing cavity or bubble to enlarge said bubble, while a suitable mold closure, preferably a recessed bottom plate, is held in engagement with the bottom of the parison mold. The contraction and elevation of the glass in the bottom portion of the charge as above described prevents contact between the mold closure and the bottom of the charge in the interim between the severing and blowing operations, thus insuring that the bottom of the charge will have sufficient time to reheat. The enlargement of the bubble in the charge by blowing against a recessed bottom plate forces the glass in the parison into intimate contact with the walls of the parison mold cavity and with the recess in the bottom plate, thereby effecting uniform and relatively rapid chilling of the glass, and uniform distribution of the glass in all parts of the parison.

My novel method and apparatus permit the preliminary blowing of the parison as described while the glass still is relatively hot, so that the uniform distribution of the glass in the parison, and the removal of the shear mark, may readily be accomplished.

In order that the invention may fully be comprehended, and its manifold advantages understood, reference should be had to the accompany drawing, in which the several figures show one form of apparatus by which the method of my invention may be practiced, and illustrate several steps in the performance of said method.

Figure 2:
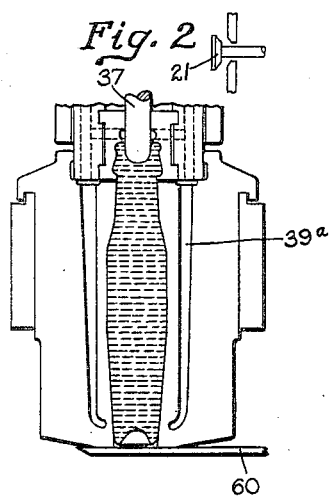
Figure 3:
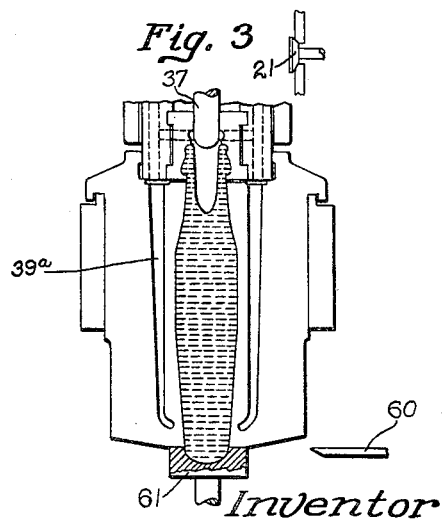

In said drawing:

Figure 1 is a view in vertical longitudinal section, showing a parison mold unit filled with glass prior to the removal of the mold unit from contact with the glass of the gathering pool;

Fig. 2 is a view similar to Fig. 1, but showing only a fragmentary portion of the construction shown in Fig. 1, and illustrating the recess formed in the bottom of the charge of glass immediately after the severing operation; and Fig. 3 is a view similar to Fig. 2 but showing the parts of the apparatus in the positions which they occupy during the application of preliminary blowing pressure to the glass, and showing the parison in completed form.

Referring in detail to the drawing, the suction and blow head structure is designated generally at 1. The neck mold supports indicated at 2 are held in sliding engagement with the bottom of the head 1 for movement toward and away from each other, by suitable means not shown, and forming no part of the present invention. Connected to the supports 2, are holders 3 which carry the neck mold sections indicated at 4. The holders 3 preferably are loosely connected to the supports 2 by bolts 5 screw-threaded into the said holders, and loosely fitting in openings 6 provided in the supports 2. The inner ends of the openings 6 are enlarged as indicated at 7 to accommodate compression springs 8 which serve to take up the play between the supports and the holders and to yieldingly hold the sections of the neck mold in engagement with each other when the neck mold is closed.

Mounted beneath the neck mold is the parison mold, the sections of which are indicated at 9. The sections 9 of the parison mold are carried by holders 10 with which suitable mechanism, not shown, cooperates for opening and closing the parison mold at appropriate times. The sections of the parison mold preferably are recessed as indicated at 11 to receive the bottom portions of the neck mold and of the holders 3, whereby after the neck mold has been closed and the parison mold also is closed, the neck mold will be retained in closed position by the parison mold, and exact alignment of the neck mold and parison mold cavities will be assured.

In order to provide for air-tight connections between the holders 3, the neck mold, and the parison mold, means is provided for yieldingly holding the molds in engagement with each other when they are closed. To this end, a chamber 12 is provided in the head 1. Slidably mounted in the chamber 12 is a sleeve 13. A spring 14 is interposed between the cover 15 of the head, and the top of the sleeve 13 to yieldingly urge said sleeve downwardly into engagement with the top of the holders 3, which, in turn, are yieldingly held in engagement with the sections of the parison mold. When the parison mold is opened, spring 14 expands forcing the sleeve 13 and the holders 3 downwardly a short distance, the downward movement of the sleeve 13 being limited by a narrow flange 16 on said sleeve which strikes a shoulder 17 formed on the wall of the chamber 12. When the parison mold is closed, however, the holders 3 and neck mold sections, together with the sleeve 13 are elevated a slight distance, compressing the spring 14 which provides an airtight joint not only between the holders, the neck mold, and the parison mold, but also between the bottom of sleeve 13 and the tops of the holders 3.

Considering now the distribution and application of vacuum and preliminary blowing air to the molds, it will be observed that a valve casing 18 is mounted on one side of the head 1. The casing 18 has a vacuum chamber 19 formed therein which communicates through a port 20 with a suitable source of vacuum. The application of vacuum is controlled primarily by means of an inwardly opening tappet valve 21 which opens and closes a passageway 22 leading from the chamber 19 into a chamber 23 formed in the head 1. The valve 21 is urged toward closed position by means of a compression spring 24 and said valve is opened and closed at appropriate times by suitable means, not shown.

The chamber 23, previously referred to, also constitutes a preliminary or puff blowing air chamber to which blowing air is conducted through the following means: Provided in the casing 18 is a chamber 25. A conduit 26 leads into chamber 25 and through this conduit blowing air is supplied through suitable time-controlled valve mechanism, not shown, operating in timed relation with the vacuum valve and other parts of the mechanism. Chamber 25 is in registry with a horizontal duct 27 which leads through a vertically downwardly extending duct into the chamber 23. The force of the preliminary blowing air and the rate of passage thereof into the chamber 23 may be controlled by means of a needle valve 28 extending through the chamber 25, and cooperating with a seat formed at the entrance end of duct 27, as shown.

Chamber 23 communicates through an inwardly and downwardly extending duct 29 with an annular space 30 which is provided by a skirt 31 formed on the bottom of the sleeve 13. The skirt 31 has vertical passageways 32 formed therein which are in registry respectively with similar passageways 33 formed in the holders 3. The passageways 33 communicate at points above the bottom ends thereof with radial ducts 34 which lead into the top of the neck mold cavity 35, through a port 36. The application of vacuum and blowing air is controlled partially by the neck pin or plunger 37 which extends into the port 36 to greater or less extent, and is elevated to open, and lowered to restrict, said port, as will hereinafter appear. At their lower ends, the passageways 33 open into an annular groove 38 formed in the parison mold, which groove communicates with radial passages 39 leading into the parison mold cavity, and with the usual passages 39a, as shown. Preferably, check valves, not shown, are interposed in the passages 33 below the ports 34 to permit the application of vacuum in the passages 39 and 39a, while preventing the flow of pressure air thereto. Such a valve is shown in the co-pending application of Edward H. Lorenz, Ser. No. 393,406, filed Sept. 18, 1929.

As previously stated, the neck pin is adjusted to various positions during the gathering of the charge and the shaping of the charge into a parison. The mechanism for effecting these adjustments of the neck pin is as follows:

Mounted on the head 1 is an air motor 40. Air pressure is alternately admitted to and exhausted from the opposite ends of the air motor 40 through conduits 41 and 42. The passage of air through the conduits 41 and 42 is controlled by suitable valve mechanism not shown, operating in timed relation to the operation of the other parts of the mechanism. The air motor 40 is connected to a crank arm 43 rigidly secured to a horizontal shaft 44. The shaft 44 is journaled in a bracket 45 provided on the valve casing 18. Secured to the shaft 44 is a crank arm 46. The arm 46 is connected at its inner end with a vertical plunger 50 which extends downwardly through cover 15 and sleeve 13, as shown. Plunger 50 is guided in its movements by guides 51 and 52 formed on said cover and by the sleeve 13. The plunger 50 is yieldingly urged upwardly by means of a compression spring 53. The spring 53 rests upon an inwardly extending flange provided in the sleeve 13 and bears against a collar 54 which engages a shoulder formed on the plunger. The expansion of spring 53 is limited by collar 54 striking guide 52 to hold plunger 50 in an intermediate position, as hereinafter explained.

The lower end of the plunger 50 has a cylindrical recess 55 formed therein in which the upper end portion of the neck pin 37 is loosely received. The neck pin 37 is slidably connected to the lower end of the plunger by means of a pin 56, the ends of which pin extend through slots provided in the lower end of the plunger 50, one of which is shown at 57. This construction provides a lost motion connection between the plunger 50 and the neck pin 37. The neck pin 37 is urged downwardly relative to the plunger by means of a compression spring 58 interposed between the inner end of recess 55 and the top of the neck pin.

Downward movement of the neck pin 37 relative to the neck mold is limited by a collar 59 provided on the neck pin, which collar strikes the top of the neck mold when the neck pin is depressed. When the neck pin is depressed to such an extent that the collar strikes the top of the neck mold, the lost motion connection between the plunger 50 and the neck pin permits the plunger to be moved downwardly independently of the neck pin so that the spring 58 is compressed and the neck pin is yieldingly held in its lowermost position. This construction prevents undue shock to the mechanism when the neck pin is depressed.

As shown diagrammatically in Figs. 2 and 3, a shear blade 60 is provided for severing the tail of glass from the charge after it has been gathered. The shear blade may be supported and operated in any suitable known manner but preferably is mounted to move with the parison forming unit. Thus, the shear blade may be employed for supporting the charge during the preliminary blowing thereof. But it is preferred to use a recessed bottom plate, such as is indicated at 61 in Fig. 3, as a bottom closure for the parison mold in lieu of the shear blade.

As will be understood, the above described mechanism is supported in suitable manner for movement toward and away from the gathering pool. It may be mounted on a vertical ram carried by a rotary table; or it may be supported by a reciprocating carriage as shown, for example, in the copending application of Karl E. Peiler, Ser. No. 396,443, filed Oct. 1, 1929. In either case, suitable means is provided for operating the various parts of the parison forming mechanism in timed relation to each other.

In the operation of the above described apparatus and in practicing the method of this invention, the parison mold unit is moved over the gathering pool and lowered to dip the parison mold into the glass in said pool. At this time, vacuum valve 21 is opened, and the neck pin is held in its uppermost position by the admission of fluid pressure through conduit 42 of the air motor and the exhaust of fluid pressure through conduit 41 thereof.

As the filling of the parison mold nears completion, the neck pin is depressed to its lowermost position by the reverse operation of the air motor. This restricts the passage of vacuum through port 36 and causes the initial blowing cavity to be formed in the charge and the neck finish to be formed and set. The mold unit is now raised out of contact with the glass in the gathering pool, and the shear blade is operated to sever the tail from the charge of glass which drops back into the gathering pool.

At the instant that the severing operation is completed, air is exhausted from the upper end of the air motor through conduit 41 as a result of which plunger 50 is forced upwardly by spring 53 until collar 54 strikes guide 52. This raises the neck pin to an intermediate position as illustrated in Fig. 2. Such elevation of the neck pin is effected prior to the closing of the vacuum valve 21 so that atmospheric pressure acting on the bottom of the charge forces the glass upwardly to an extent corresponding to the distance the neck pin is raised, causing a recess of substantially semi-spherical shape to be formed in the bottom of the charge, as shown, for example, in Fig. 2. The formation of the recess causes the bottom and bottom edge portions of the charge to be retracted, inwardly of the mold cavity, and the bottom edge portion of the charge is drawn away from the wall of the mold cavity by contraction thereof. The upward movement of the glass and the withdrawal of the bottom edge portion thereof from contact with the mold cavity prevents undue chilling of the bottom portion of the charge, and permits portions chilled by the shearing operation to reheat and recondition out of contact with the mold or shear prior to the preliminary blowing of the parison.

Subsequently, the vacuum valve 21 is closed and preliminary blowing air is introduced into the head 1 and into the neck mold and thence into the preliminary blowing cavity, Fig. 3. At this time, the neck pin is raised to its uppermost position through operation of the air motor 40 to permit unrestricted application of the preliminary or puff-blowing air through the port 36 into the blowing cavity. Prior to the admission of preliminary blowing air, the bottom plate 61 is moved into engagement with the bottom of the parison mold to support the charge during the preliminary blowing operation, as will be understood. But during the entire period between the glass severing and preliminary blowing operations, the bottom of the charge is held out of contact with the parts of the mechanism as already described. The application of preliminary blowing pressure to the charge with the bottom plate in position, enlarges the bubble or blowing cavity therein, and forces the bottom of the charge into the recess of the bottom plate completing the formation of the parison. The preliminary blowing operation not only forces the glass into intimate contact with the walls of the neck and parison molds, but effects uniform distribution of the glass throughout all portions of the body of the charge, especially the bottom portion thereof which is expanded into the recess of the bottom plate.

Various changes may be made in the details of construction of the apparatus illustrated and described herein and in the mode of procedure in practicing the method of this invention. It is to be understood that the performance of the method is not limited to the use of the particular form of apparatus shown herein, but other forms of apparatus may be used in carrying out said method.

Having thus described the invention, what I desire to claim and to secure by Letters Patent is:

1. The method of gathering and imparting a preliminary shape to a charge of glass which comprises, lowering a suction gathering unit which includes a blank mold, a neck mold, and a plunger in the neck mold, into contact with a pool of molten glass, filling said molds with glass from the pool by the application of suction, thus forming an exterior neck finish on, and a blowing cavity in, the charge of glass by such application of suction, thereafter severing the tail of glass from the charge in said unit, and moving the severed end of the charge of glass upwardly above the severing plane while retaining the plunger in engagement with the glass to preserve the blowing cavity.

2. The method of gathering and imparting a preliminary shape to a charge of glass which comprises, lowering a suction gathering unit into contact with a pool of molten glass, filling said unit with glass from the pool by suction and forming a blowing cavity in the charge, severing the tail of glass from a charge in said unit, and withdrawing the bottom edge portion of said charge from contact with the wall of the mold cavity by the application of vacuum to the top of the charge to permit said portion to reheat out of contact with said mold, and substantially preserving the blowing cavity in the charge during the withdrawing operation.

3. The method of gathering and imparting a preliminary shape to a charge of glass which comprises, lowering a suction gathering mold unit into contact with a pool of molten glass, filling said unit with glass from the pool by suction, forming a blowing cavity in said charge, severing the tail of glass from the charge in said unit, drawing a portion of the bottom of the charge of glass upwardly relative to said mold unit above the plane of the bottom of said unit, and also drawing the bottom edge portion of said charge from contact with the wall of the mold by the application of vacuum to the top of the charge, to permit the bottom and bottom edge portions of said charge freely to reheat, said blowing cavity being substantially preserved during said drawing operation.

4. The method of gathering and imparting a preliminary shape to a charge of glass which comprises, lowering a suction gathering mold unit into contact with a pool of molten glass, filling said unit with glass from the pool by suction, forming a blowing cavity in said charge, severing the tail of glass from the charge in said unit, subjecting the charge of glass in said unit to preliminary blowing pressure to compact the glass in said unit, and moving the bottom and bottom edge portions of the charge out of contact with the charge fabricating mechanism in the interim between the severing and preliminary blowing operations, while substantially preserving the blowing cavity for the blowing operation, and while preventing movement of the charge as a whole in said unit.

5. The method of gathering and imparting a preliminary shape to a charge of glass which comprises, lowering a suction gathering unit into contact with a pool of molten glass, filling said unit with glass from the pool by suction, severing the tail of glass from the charge in said unit, forming a recess in the bottom of said charge by the application of vacuum to the top of the charge, to move the bottom portion of the charge inwardly of the mold beyond the plane of the bottom thereof, and subsequently applying pressure to the charge to compact it in said unit.

6. The method of gathering and imparting a preliminary shape to a charge of glass which comprises, filling a parison mold unit with glass, moving a closure into engagement with the open end of said unit to support the charge of glass for preliminary blowing, forming a recess in the bottom of the charge to displace a bottom portion of the charge inwardly beyond the plane of the bottom of the mold prior to enclosing the open end of said mold unit, and subsequently applying preliminary blowing pressure to said charge to compact it in said unit.

7. The method of gathering and imparting a preliminary shape to a charge of glass which comprises, filling a parison mold unit with glass, forming a recess in the bottom of a charge of glass in said unit by applying vacuum to the top thereof to displace the bottom portion of the charge inwardly of said unit beyond the plane of the bottom thereof, and to contract the bottom edge portion of the charge to withdraw the said portion from contact with the mold wall, and subsequently compacting the charge in said unit.

8. The method of gathering and imparting a preliminary shape to a charge of glass which comprises, lowering a suction gathering mold of substantially fixed capacity into contact with a pool of molten glass, filling said mold with glass from the pool by suction, severing the tail of glass from the charge in said mold, moving a closure into engagement with the open end of said mold for supporting the charge for preliminary blowing, and drawing the bottom edge portion of the charge out of contact with the mold and the mold closure during the interim between the severing and preliminary blowing operations, while preventing movement of the charge as a whole in the said mold.

Signed at Hartford, Connecticut this 6th day of November, 1929.

ALGY J. SMITH.